Feb. 27, 1962    J. R. NERISON    3,023,411
AUTOMATIC RADIO DIRECTION FINDER
Filed March 23, 1959    4 Sheets-Sheet 1

INVENTOR
JAMES R. NERISON
BY Braddock and Braddock
ATTORNEYS

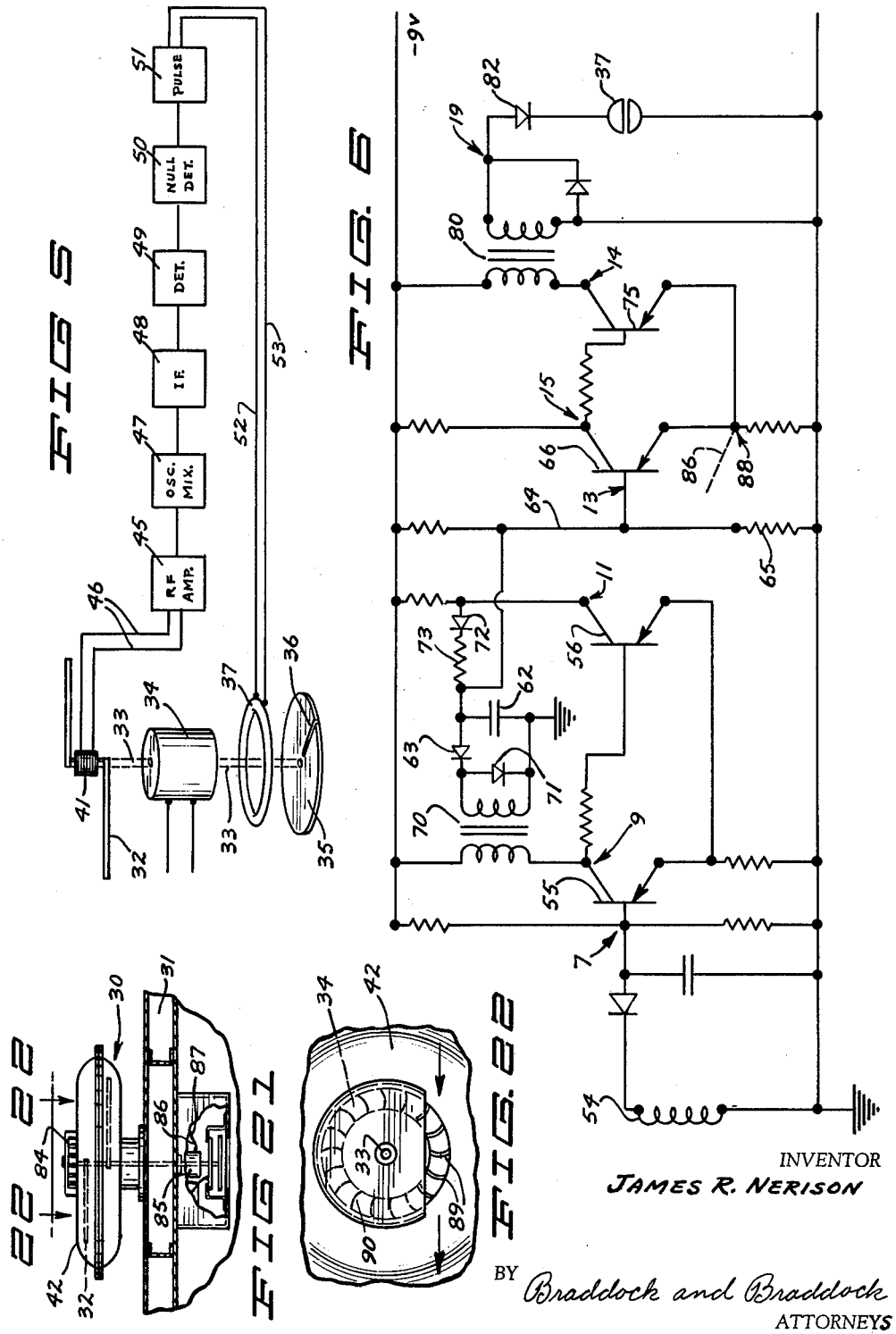

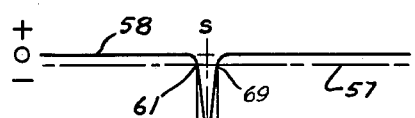
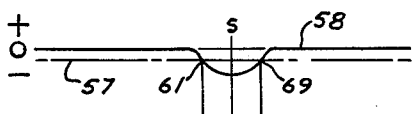
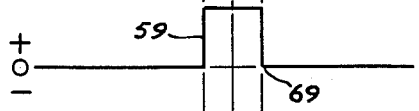
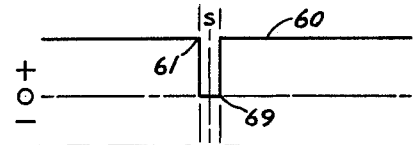
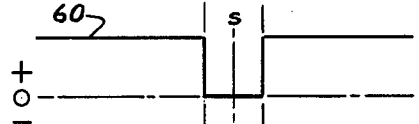
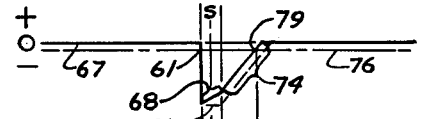
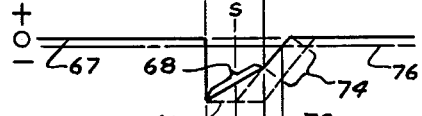
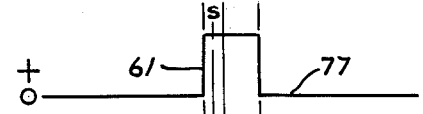
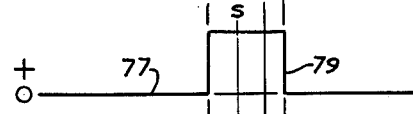
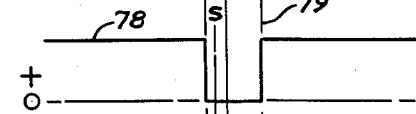
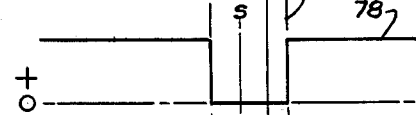
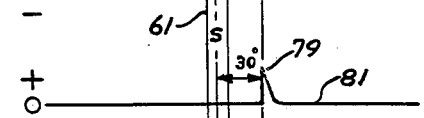

Feb. 27, 1962  J. R. NERISON  3,023,411
AUTOMATIC RADIO DIRECTION FINDER
Filed March 23, 1959  4 Sheets-Sheet 4
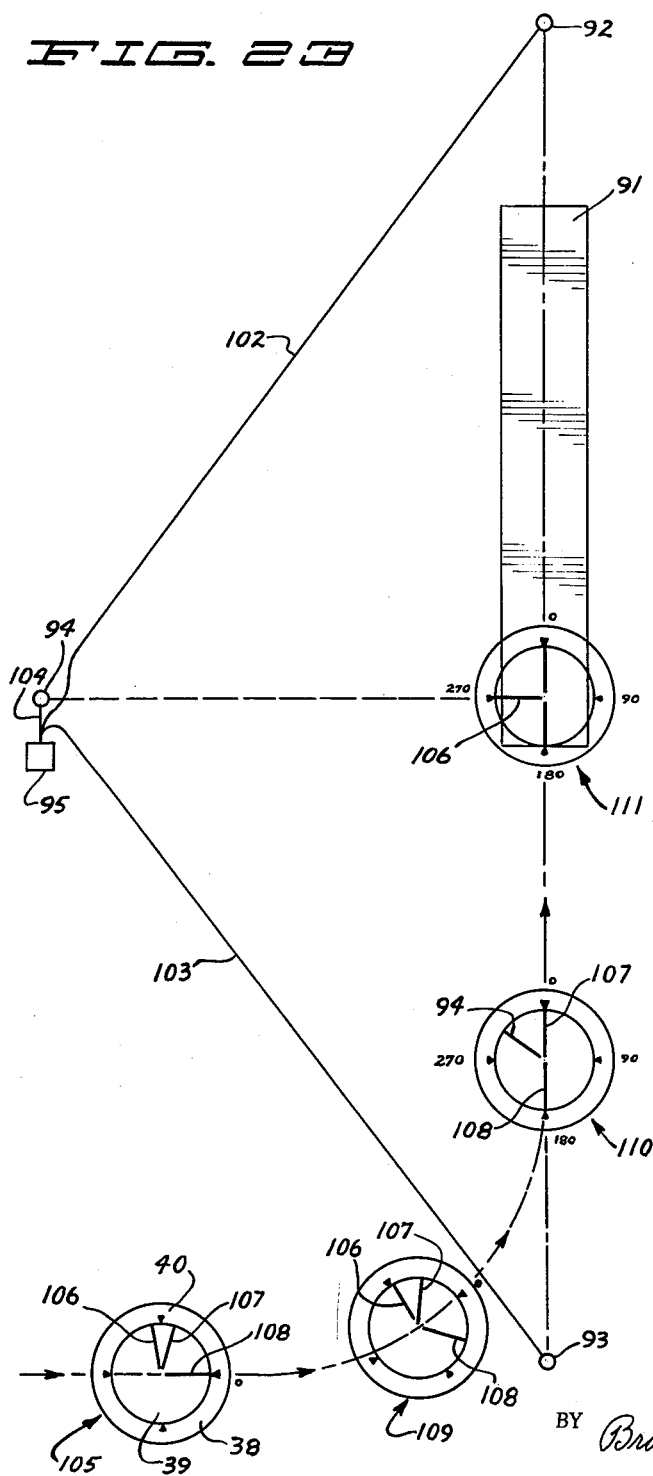
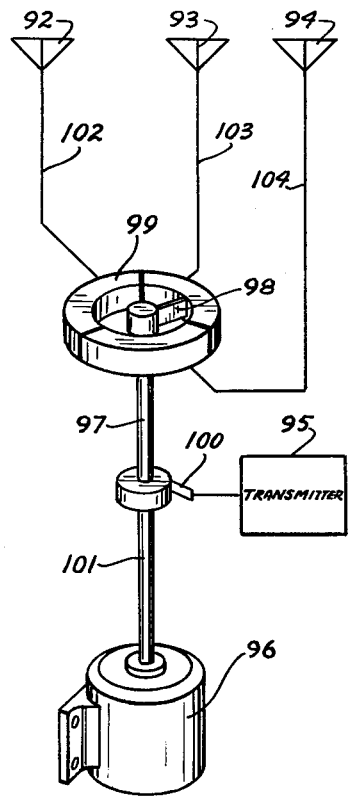
INVENTOR
JAMES R. NERISON
BY Braddock and Braddock
ATTORNEYS United States Patent Office 3,023,411
Patented Feb. 27, 1962

3,023,411
AUTOMATIC RADIO DIRECTION FINDER
James R. Nerison, Phoenix, Ariz., assignor to Frontier Electronics, Phoenix, Ariz., a corporation
Filed Mar. 23, 1959, Ser. No. 801,180
10 Claims. (Cl. 343—118)

This invention has relation to an automatic radio direction finder in which a stroboscopic device is associated with a rotating antenna and indicator in such a manner as to relate the positioning of the indicator to the direction toward a distant broadcasting station when the antenna is in a null-signal receiving relationship to said station. While direction finders of this general type are known, they are subject to certain distinct disadvantages and difficulties. One of the major difficulties of previous devices has been the inability of such devices to indicate accurately the exact null point. For this reason, the accuracy with which a station direction can be indicated by devices of this general type is proportional to the intensity of the signal being received from the transmitting station.

In a device made according to the present invention, however, a time delay divider circuit is utilized to exactly determine and indicate the center of the diminished or null including portion of a received signal.

Optimum results can be obtained in conjunction with the present invention when the antenna is rotating at a fairly high rate of speed, for example, on the order of eighteen hundred revolutions per minute; although the direction finder will operate satisfactorily at much lower speeds also. In order to be effective at such high speeds, the usual slip ring connections from the antenna to the receiver have not proved entirely satisfactorily. Accordingly, a Z-shaped antenna of ferrite or other magnetic material which offers a lower path of reluctance than the air is used. An induction coil is situated around the center leg of the Z, and the antenna is rotated with this center leg as an axis. A signal proportional to the signal effective on the antenna will be forthcoming from the inductance coil and will be fed to a receiver of the present invention. This signal is detected and filtered and fed to a null detection stage where the exact location of the null with respect to the cycling of the antenna is determined and a signal related to the positioning of this null but delayed in time is fed to a pulsing circuit which causes a stroboscopic light to be energized in such a way that it reveals the positioning of an indicator which rotates at the same rate as the antenna with respect to indicia fixedly positioned about the indicator.

A device made according to the present invention will be found to be useful in a number of different forms and situations.

For example, by use of such a device, broadcasts coming alternately from a plurality of spaced apart transmitters on a single frequency will result in the reception of a plurality of direction indications on a single instrument. This can be particularly useful when the direction finder is carried by an aircraft or a ship when it is desired to move from the location of one broadcasting station toward the location of another. In the case of aircraft, such a device can be utilized in an effective instrument landing system.

In the drawings,

FIG. 5 is diagrammatic representation of the mechanical portions of a direction finder made according to the preceding figures and a block diagram of the receiver mechanism associated therewith;

FIG. 6 is a circuit diagram of the null detector and the pulse stages laid out in FIG. 5;

FIG. 7 is a diagrammatic representation of the current flowing at point 7 of the circuit of FIG. 6 during an interval of time which includes the reception of a null by the rotating directional antenna of the preceding figures as it would appear when a strong signal is being received from the broadcasting station;

FIG. 8 is a diagrammatic representation of the current flowing at said point 7 with respect to a similar time interval when the signal being received from the broadcasting station is relatively weak;

FIG. 9 is a plot of the current which will flow at the point 9 of the circuit of FIG. 6 responsive to flow of the current illustrated in FIG. 7 and over the same time interval;

FIG. 10 is a plot of the current which will flow at said point 9 in response to the flow of current illustrated in FIG. 8;

FIG. 11 is a plot of the current which will flow at the point 11 in FIG. 6 in response to the flow of current illustrated in FIG. 9;

FIG. 12 is a plot of the current which will flow at said point 11 in FIG. 6 in response to the flow of current illustrated in FIG. 10;

FIG. 13 is a plot of the current which will flow at point 13 in FIG. 6 in response to the flow of current illustrated in FIG. 11;

FIG. 14 is a plot of the current which will flow at said point 13 in FIG. 6 in response to flow of current illustrated in FIG. 12;

FIG. 15 is a plot of the current which will flow at said point 15 in FIG. 6 in response to the flow of current illustrated in FIG. 13;

FIG. 16 is a plot of the current which will flow at said point 15 in FIG. 6 in response to the flow of current illustrated in FIG. 14;

FIG. 17 is a plot of the current which will flow at point 17 in FIG. 6 in response to the flow of current illustrated in FIG. 15;

FIG. 18 is a plot of the current which will flow at said point 17 in FIG. 6 in response to the flow of current illustrated in FIG. 16;

FIG. 19 is a plot of the current which will flow at said point 19 in FIG. 6 in response to the flow of current illustrated in FIG. 17;

FIG. 20 is a plot of the current which will flow at said point 19 in FIG. 6 in response to the flow of current illustrated in FIG. 18;

FIG. 21 is a side elevational view of a device made according to a second form of the invention with parts broken away;

FIG. 22 is a top plan view of the device of FIG. 21 as seen on the line 22—22 in that figure;

FIG. 23 is a diagrammatic representation of an air strip and associated antenna for use in utilizing the indicator of the present invention in connection with a blind landing system, shown in conjunction with a diagrammatic representation of a plurality of successively positioned indicators of the present invention illustrating the direction lines thereon; and FIG. 24 is a diagrammatic representation of a transmitting station and a signal distributor for supplying signals to the antennas illustrated in FIG. 23.

Figure 1:
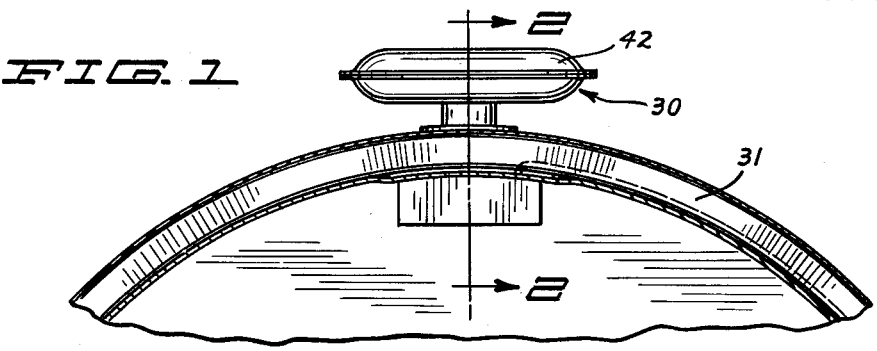
FIG. 1 is a front elevational view of a radio direction finder of the present invention associated with a portion of the top of the fuselage of an aircraft.
Figure 2:
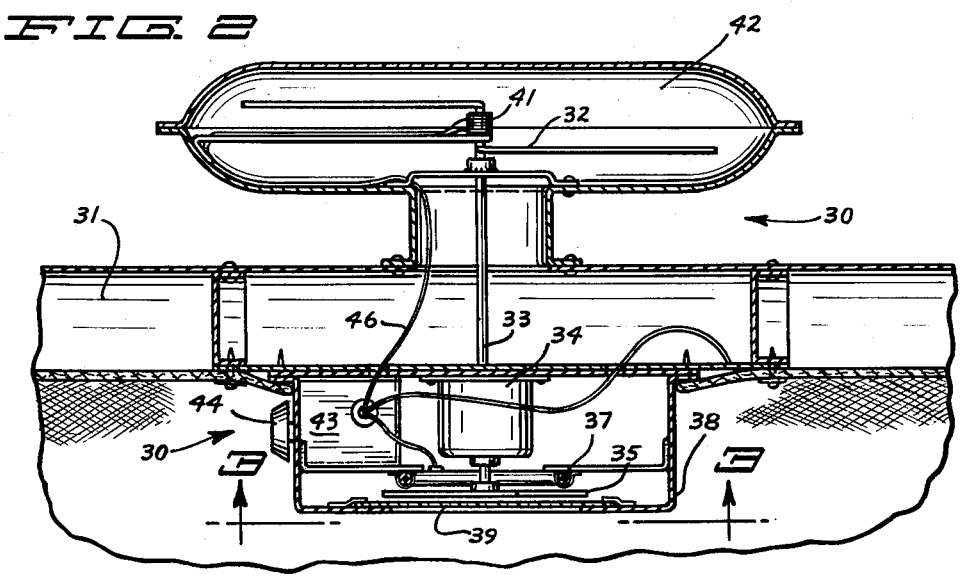
FIG. 2 is an enlarged vertical sectional view taken on the line 2—2 in FIG. 1.
Figure 3:
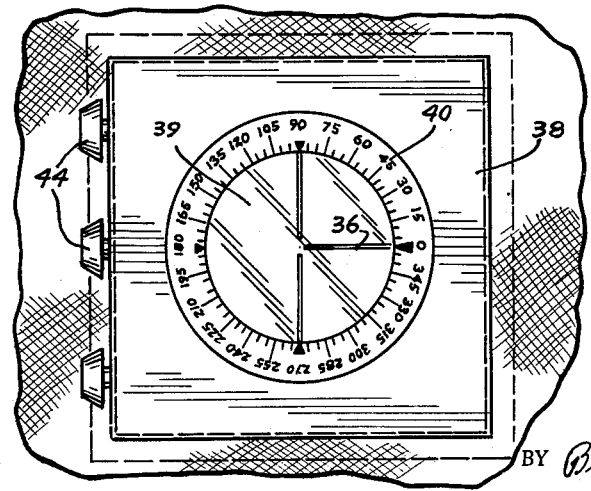
FIG. 3 is an enlarged fragmentary bottom elevational view taken on the line 3—3 in FIG. 2.
Figure 4:
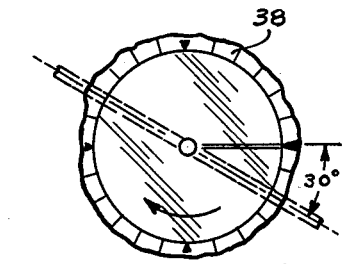
FIG. 4 is a fragmentary bottom elevational view of a portion of the indicator as seen in FIG. 3, but also disclosing the relationship of it to a rotating antenna associated therewith.

Referring now to FIGS. 1 through 20 of the drawings, a radio direction finder made according to a first form of the invention is indicated generally at 30, and is mounted, as shown, in the upper part of a fuselage 31 of an aircraft by way of example. It is to be understood, however, that such a radio direction finder will be equally effective and useful when employed in a ship, boat, or other moving vehicle or when employed at a stationary position to indicate the direction of a distant transmitter.

In the form of the invention as shown, a Z-shaped antenna 32 of ferrite or similar material is integral with a nonmagnetic shaft 33 extending outwardly from an electric motor 34 which is fixedly mounted with respect to the fuselage of the aircraft 31. This shaft 33 extends through the motor 34 to support an opaque indicator disc 35 which is provided with a slot 36 therethrough. The motor 34 is of the constant speed type and, in one embodiment of the invention, can rotate the shaft 33 at eighteen hundred r.p.m. A neon or other stroboscopic light 37, here shown in the shape of a ring, is mounted between the motor 34 and the opaque disc 35 in surrounding relationship to the shaft 33. A case 38 encloses the motor, indicator, stroboscopic lamp, and supports a translucent sight glass 39 in covering relation to the disc 35. Indicia 40 representing the 360 degrees of a compass rose are inscribed on the case 38 on the periphery of the sight glass 39.

An induction coil 41 is situated in surrounding relationship to the center leg of the Z-shaped antenna 32 and is fixedly mounted with respect to the frame of the aircraft on an antenna cover 42 which protects the antenna from the weather.

Various electrical components of the receiver can be situated inside of a shielded enclosure 43 and can be provided with suitable controls 44.

These electronic components can include a radio frequency amplifier 45 which receives its signal from antenna 32 by way of induction coil 41 and lines 46, 46. This stage feeds to an oscillator and mixer stage 47 which in turn feeds an intermediate frequency stage 48. A detector stage 49 follows. All of these stages may be of any unusual or preferred superheterodyne circuit. The signal leaving this detector stage will resemble that pictured in FIGS. 7 and 8 depending on whether the input from the antenna was strong or weak. This signal is fed to a null detector stage 50 and a pulse generator stage 51. These two stages are combined and shown in detail in FIG. 6. Output from the pulse generator stage 51 is fed to the stroboscopic light 37 by means of the lines 52 and 53.

When the voltage output of detector stage 49 is applied to inductance coupling 54 of the null detector stage, the net current appearing at the point 7 at the base of first PNP transistor 55 is the resultant current developed by the directional antenna 32 as it rapidly varies in its angular relationship to the signal coming from the transmitting station. Typical curves illustrating the current at this point are presented in FIGS. 7 and 8. In these figures, and in FIGS. 9 through 20, the current flowing is indicated along the axis of ordinates, while a fraction of the time required for a complete revolution of the antenna is shown along the axis of abscissae. This time interval covers the time in which one end of the rotating antenna is alined exactly with the transmitting signal and a short interval of time before and after this event. In FIGS. 7 and 8, and in FIGS. 9 through 20, this instant of precise alinement of the antenna 32 with the source of transmitting signal is indicated by the letter "S."

A line of zero current flow and areas of both positive and negative current flow are indicated on each of the FIGURES 7 through 20.

The amplitude and width of this null current pattern illustrated in FIGS. 7 and 8 will vary directly with the energy being received by the antenna 32. In FIGURE 7 is shown a wave form which would result if a strong signal was being received by the antenna, and in FIGURE 8 is illustrated a wave form as it would appear if a relatively weak signal was being received.

The first transistor 55 and a second PNP transistor 56 are connected in a positive feedback circuit commonly referred to as a monostable multivibrator. In this circuit, first transistor 55 is normally non-conducting while second transistor 56 is normally conducting.

In FIGS. 7 and 8, the broken line 57 indicates the negative trigger level of first transistor 55. When negative going current 58 in these figures passes this trigger level 57, the conduction state of both of the transistors instantly reverses. First transistor 55 begins conducting, and the current 59 flowing at the point 9 will resemble the curves of FIGS. 9 and 10, while the cut off of current 60 flowing in the second transistor 56 and consequently at point 11 will cause a pattern roughly as set out in FIGS. 11 and 12. A fixed maximum current flow is needed at the points 9 and 11 for proper operation of the direction finder as disclosed, and these values will be obtained through the instrumentality of a clipping circuit or the like.

When current 58 crosses the negative trigger level 57 at the point 61 in FIGS. 7 and 8, current 59 at point 9 jumps to its maximum value, and through a transformer 70 instantly causes charging of a condenser 62 through a diode 63 to ground. This condenser 62 is connected through a line 64 with one end of a first condenser discharging through resistor 65. The other end of this resistor is connected to ground. Current flowing in this line 64 and at the base of a third PNP transistor 66 is illustrated as at 67 in FIGS. 13 and 14. As previously pointed out, when the point in time indicated 61 is reached, the current 59 flowing at the point 9 immediately charges condenser 62 and discharge of that condenser through resistor 65 initially begins along a portion of the current curve 67 indicated 68. The slope of the curve 68 is determined by this first rate of discharge which is determined by the resistance of resistor 65. Discharge at this first rate will continue as long as the first transistor 55 is in operation and the second transistor is cut off or until condenser 62 is appreciably discharged. The value of the charge on the condenser 62, the capacity of the condenser itself, and the resistor 65 will be such, however, that this discharge of the condenser will not occur during the time interval elapsing while the current 68 is below the trigger level of first transistor 55. As the negative going current 58 becomes less negative and crosses said trigger level line 57 in FIGS. 7 and 8, as indicated at time instant 69, first transistor 55 will be cut off and second transistor 56 will go into operation. When this happens, a reverse pulse is generated at transformer 70; but this pulse is shunted to ground by the diode 71. Conduction of the second transistor 56 effectively reduces the resistance to discharge flow of the condenser 62 through a diode 72, and effectively puts resistance 73 in parallel with resistance 65 between the condenser and ground. At this point, discharge of the condenser 62 will proceed at a faster or second rate. Current 67 flowing at point 13 during this second rate of discharge is indicated as at 74.

Third transistor 66 and a fourth PNP transistor 75 are also connected together in a feed back circuit to form a mono stable multivibrator. The negative trigger level of third transistor 66 is indicated as at 76 in FIGS. 13 and 14. When the condenser 62 was charged at the instant in time indicated 61 on all of the curves, this trigger level 76 was crossed, and third transistor 66 changed from a non-conducting to a conducting state as indicated by current line 77 in FIGS. 15 and 16. This also instantly caused cut off of current 78 in fourth transistor 75 as indicated in FIGS. 17 and 18. This situation remains constant until discharge current from the condenser 62 at point 13 crosses the trigger level line 76 at an instant in time indicated 79. At this point, the going into conduction of fourth transistor 75 causes an impulse to be sent across transformer 80 which appears at the point 19 as shown on current curve 81 in FIGS. 19 and 20. This current, passing through diode 82 causes an instantaneous flash of stroboscopic light 37. Light from this stroboscopic lamp will pass through the slot 36 in the opaque disc 35 and will be visible as a line of light on said sight glass. Assuming that the antenna is rotating at 1800 r.p.m., approximately 1800 such stroboscopic flashes will take place each minute, and as a result, the light passing through the slot 36 and reaching the translucent sight glass will appear to be a constant fixed line. The positioning of this line on the sight glass will be directly related to the null receiving position of the antenna 32 with respect to the received distant station for reasons which will now be pointed out.

Values of resistors 65 and 73 can be chosen such that the discharge of condenser 62 through resistor 65 at its first rate takes place at exactly one-half of the second rate of discharge of the condenser through both of the resistors. In this situation a backward extension of that portion of the curve 74 representing discharge of the condenser 62 through both of the resistors will intersect a line 121 through maximum negative current value parallel to the horizontal axis of curves in FIGS. 13 and 14 at a point representing the exact center of the null indicated by line "S." As long as the rate of rotation of the antenna in revoluitons per minute remains constant, the second rate of discharge of the condenser through both of the resistors remains constant, and the maximum value of current flow from the condenser and consequently at point 13 remains constant, the portion of curve 67 indicated at 74 will always intersect the negative trigger level line 76 after the antenna has rotated past its exact point of null alignment by a fixed number of degrees. For purposes of illustration, we will assume that this point occurs and, consequently, that the stroboscopic lamp flashes after the antenna has rotated 30 degrees past the null point. By offsetting the calibrated indicia 40, 30 degrees with respect to the actual physical positioning of the antenna 32, therefore, the stroboscopic flash while seen 30 degrees after the null position has been reached, will register exactly with the null point as calibrated on the case 38. This relationship is most clearly seen in FIG. 4.

It is to be understood that other first and second discharge rates could be utilized when other results are desired. If, for example, a stroboscopic flash or other signal or control impulse was desired to be related to a point two-thirds of the way between the beginning and end of current flow at point 9 in FIG. 6, the resistors 65 and 73 would be of such value that the first discharge rate was one-third of the second discharge rate.

From the above, it will be evident, that the circuit of the present invention as disclosed in FIG. 6 will be useful in relationships other than as part of a radio direction finder. The null detecting circuit of the invention will find application in the field, for example, of automation where location as to a percentage or fraction of an unknown measurement is desired to be determined. These unknown measurements can be of time, distance, size, rate of temperature change, or any other measurement which can be related to time. To utilize the present invention in such situations, a condenser similar to condenser 62 in the foregoing example can be charged to a predetermined level, and can be started discharging at any desired first rate upon the occurrence of a first event. It can then be started discharging at a second rate upon the occurrence of a second event. When the condenser reaches a predetermined state of discharge, a signal impulse can be forthcoming from the circuit of the invention. The time of the occurrence of the signal impulse will lag behind a time exactly midway between the happening of the first and second events if the first rate of discharge was exactly one-half of the second rate of discharge.

Relating this to a specific example, a circuit of the present invention could be used to indicate the exact midpoint of a series of pieces of undetermined length passing along a conveyor belt under a measuring device. Such a measuring device could be mechanical (a finger displaced by the arrival and departure of the piece being measured) or photo-sensitive (a photo-electric cell), etc. In any case, when the leading edge of the piece being divided first caused activation of the measuring device, a condenser similar to condenser 62 would be started to discharge at a first rate of discharge. When the trailing edge of the piece being measured and divided caused second activation of the measuring device, the rate of discharge of the condenser would be changed from said first rate to a second rate equal to twice that of the first rate. When the condenser became discharged to a predetermined lower level, an impulse from the circuit of the invention would cause activation of a marking device. For a known fixed rate of travel of the conveyor belt, the operation of the marking device will lag the exact center of the distance being measured by precisely the time it would take the condenser to discharge at the second rate from its known fixed maximum to its predetermined minimum marking device impulse point. By positioning the marking device from the measurement device along the conveyor belt exactly the distance which said belt will travel in this full discharge time, the marking device will mark the piece of undetermined length in the exact center thereof.

Referring now to FIGS. 21 and 22, a radio direction finder 30 is identical with the radio direction finder 30 of FIGS. 1 through 6 with the exception that the constant speed electric motor 34 driving the shaft 33 is replaced by a wind motor 84 situated on top of the antenna cover 42; and that a selsyn motor 85 is added which is driven by the antenna shaft 33. The output of this selsyn motor will be carried by lines 86 and 87 to a point 88 in FIG. 6 and to ground, respectively.

The wind motor 84 consists of a plurality of impellor blades 89 enclosed in a wind motor cover 90. The impellor blades are fixedly mounted with respect to the shaft 33 to cause the antenna 32, the selsyn motor 85, and the slotted indicator disc 36 to rotate in response to airflow adjacent the fuselage 31 of an aircraft when the aircraft is in flight.

The effective radius of operation of the impellor blades about the shaft 33, and the other characteristics of the wind motor will be such that when the aircraft is operating at its optimum cruising speed the rotation of shaft 33 and consequently antenna 32 will be at an approximate rate of 1800 r.p.m. In this kind of a situation however, it is to be expected that the antenna will not always rotate at precisely the desired speed. For this reason, the voltage developed by the selsyn motor is fed as described to point 88 in FIG. 6 to cause the trigger point line 76 to be effectively increased in negative direction in response to rotation of the impellor blades and antenna at greater than 1800 r.p.m., for example, and to be decreased in negative direction in response to rotation at a slower speed. In this way, the stroboscopic device projects light through the slot 36 to be truly indicative of the position of the remote transmitter on the indicator dial.

Referring now to FIGS. 23 and 24 of the drawings, an aircraft landing strip is indicated at 91. A first antenna 92 is mounted in longitudinal alignment with the center of the landing strip 91 at an "up-wind" end thereof; a second antenna 93 is also located in longitudinal alignment with said landing strip but at a "down-wind" end thereof and at a considerable distance therefrom. A third antenna 94 is located to be in exact perpendicular relationship to the longitudinal axis of said landing strip at a desirable "touch-down" point for landing aircraft and spaced at a considerable distance from said strip. A transmitter 95 feeds the radio frequency output thereof through a brush 100 along a metallic shaft 97 to a distributor brush 98. This distributor brush is rotated through the instrumentality of the shaft 97, and a nonmetallic shaft 101 by a motor 96. As it rotates, it comes alternately into contact with a plurality of distributor segments 99 which are connected by lines 102, 103 and 104 to antennas 92, 93 and 94, respectively. As the motor 96 causes the distributor brush 98 to rotate, the signal from the transmitter 95 will be broadcast alternately from each of the three antenna locations. The broadcast from each of these stations will total one-third of the time.

To utilize this apparatus of FIGS. 23 and 24 as a blind landing system, a radio direction finder such as set out in FIGS. 1 through 6 or in FIGS. 21, 22 and 6 will be employed in an aircraft and tuned to the frequency on which transmitter 95 is operating. Assuming the distributor brush to be rotating at a sufficiently high rate of speed, the stroboscopic light flashes through the disc slot 36 of the indicator disc 35 in the airborne direction finder will occur at three different positions, each aligned to indicate one of the three null points being received with the antennas 92, 93 and 94. These flashes will occur with sufficient frequency to cause the appearance of three stationary lines on the translucent sight glass 39.

In FIG. 23, are four representations of translucent sight glass indicator 39 and indicia 40 of case 38 as it would appear on automatic direction finders located at four different locations with respect to the landing strip and the three antennas. The positioning of the slot 36 of the indicator disc 35 as each of the antennas broadcasts is indicated on the face of each of these sight glasses. Should an aircraft be in the general position 105, a line such as 106 would appear on the sight glass in alignment with antenna 94, a line 107 would appear on the sight glass in alignment with antenna 92, and a line 108 would appear on the sight glass in alignment with antenna 93. As the aircraft moves in position as indicated at 109, the traces of stroboscopic light through the slot 36 on the sight glass would appear as shown. When the aircraft moved to position as indicated at 110, antenna 92 would be directly ahead of it, and antenna 93 directly behind it so the traces 107 and 108 would appear as a straight line through the center of the sight glass when the aircraft was lined up properly with the runway. The trace 106 would appear as shown. The pilot would then be in a position to lose altitude as the trace 106 moved to the 270 degree position and when it reached that position he could be assured that he was over the touch-down point of the runway. This touch-down positioning is shown at the location 111.

Among the many advantages of the system of the present invention is the positive operation of the stroboscopic lamp or other signalling device upon the presence of the null in the antenna only. Atmospheric disturbances sometimes severely effecting radio circuits would not, therefore, render the device inaccurate. Should any one null be non-existent because of a random atmospheric disturbance being present and being received by the antenna at the time when it should have been in the null area, the stroboscopic signalling device will simply fail to operate. Obviously a very large number of these failures to fire can be tolerated when there are theoretically 1800 firings or signals per minute. Since the device is operative only upon presence of a null, there can be no tendency of the apparent indicator needle swinging from side to side. The only indication will be a direct, apparently fixed, line indicating positively and accurately the direction of the distant transmitter. There will be no possibility of hunting and swinging which is a severe problem in radio direction finders developed and used before the present invention.

The entire unit can be made very compact and lightweight due to its inherent simplicity. The receiver can be located adjacent the antenna and in shielded relationship to other electrical equipment. Consequently, the direction finder can be used at any convenient location on an aircraft or other moving vehicle without danger of disturbance due to local interference; and can be sold in a price and weight range which will make it available to many small craft owners who formerly could not afford similar equipment and/or could not use it because of size and weight considerations.

What is claimed is:

1. A radio direction finder including a frame, a directional antenna rotatably mounted with respect to said frame, an indicating device mounted with respect to said frame for repetitive cyclic movement, means for rotating said antenna, means for driving said indicating device in synchronism with said antenna, a scale fixedly positioned with respect to said frame and associated with said indicating device, signalling means operative upon activation to reveal the instantaneous positioning of said indicating device with respect to said scale, means for amplifying, rectifying and filtering signals received by said antenna to produce a null-indicating signal, a condenser, a first condenser discharge means for discharging said condenser at a predetermined first rate, a second condenser discharge means for discharging said condenser at a predetermined second rate, means responsive to said null-indicating signal for charging said condenser to a predetermined maximum value when said null-indicating signal exceeds a predetermined signal level, means for rendering said first condenser discharge means effective to begin discharge of said condenser from its maximum value at said first rate operative in response to the exceeding of said predetermined trigger level value by said null-indicating signal, means for rendering said second condenser discharge means effective to begin discharge of said condenser at said second rate operative in response to the falling below of said predetermined trigger level by said null-indicating signal, and means for activating said signalling means in response to the falling below a predetermined charge level by said condenser.

2. The combination as specified in claim 1 wherein said first condenser discharge means is related to said second condenser discharge means in such a manner that said first condenser discharge rate is substantially one-half of said second condenser discharge rate.

3. The combination as specified in claim 2, wherein said indicating device is constituted as an opaque disc having a radially extending slot therethrough, wherein said signalling means includes a stroboscopic lamp positioned at a first side of said disc, and wherein said frame is provided with a sight opening in visual alignment with a second side of said disc.

4. The combination with a plurality of sources of radio frequency energy arranged in spaced relation about the boundaries of a port, and a radio direction finder on a moving craft to indicate the relative position of said radio energy sources with respect to said craft, said radio direction finder including a frame, a directional antenna rotatably mounted with respect to said frame, an indicating device mounted with respect to said frame for repetitive cyclic movement, means for rotating said antenna, means for driving said indicating device in synchronism with said antenna, a scale fixedly positioned with respect to said frame and associated with said indicating device, a signalling means operative upon activation to reveal the instantaneous positioning of said indicating device with respect to said scale, and means for amplifying, rectifying and filtering signals received by said antenna to produce a null-indicating signals, of: a condenser, a first condenser discharge means for discharging said condenser at a predetermined first rate, a second condenser discharge means for discharging said condenser at a predetermined second rate, means responsive to a given one of said null-indicating signals for charging said condenser to a predetermined maximum value when said given one of said null-indicating signals exceeds a predetermined trigger level value, means for rendering first condenser discharge means effective to begin discharge of said condenser from its maximum value at said first rate operative in response to the exceeding of said predetermined trigger level value by said given one of said null-indicating signals, means for rendering said second condenser discharge means effective to begin discharge of said condenser at said second rate operative in response to the falling below of said predetermined trigger level by said given one of said null-indicating signals, and means for activating said signalling means in response to the falling below a predetermined charge level by said condenser.

5. A radio direction finder including a case, a rotatable directional antenna, an indicating device constituted as an opaque disc having a radially extending slot therethrough rotatably mounted with respect to said case, said case being provided with a translucent sight glass in adjacent relationship to a first side of said indicating disc, indicia representing the angular relationship of said rotatable antenna with respect to said case inscribed around the periphery of said sight glass, signalling means constituted as a stroboscopic light positioned at a side of said opaque indicating disc opposite said sight glass, means for simultaneously rotating said antenna and said opaque disc, means for amplifying, rectifying and filtering signals received by said antenna to produce a null-indicating signal, a first mono stable multivibrator circuit, means for transmitting said null-indicating signal from said amplifying, rectifying and filtering means to said first multivibrator circuit, a condenser, a first condenser discharge means for discharging said condenser at a predetermined first rate, a second condenser discharge means for discharging said condenser at a second rate, said first multivibrator circuit including first and second transistors, said first transistor being normally non-conducting and said second transistor being normally conducting when said circuit is in operation, means responsive to the exceeding of a predetermined trigger level value by said null-indicating signal for causing said first transistor to conduct and said second transistor to become non-conducting, means responsive to conduction in said first transistor to charge said condenser to a predetermined maximum value and to cause said condenser to begin discharge at a first rate, means operative upon the falling below said predetermined trigger level by said null-indicating signal to cause said second transistor to begin conduction, to render said first transistor non-conductive and to cause said condenser to begin discharging at a second rate, a second mono stable multivibrator circuit including third and fourth transistors, means responsive to the charging of said condenser to cause said third transistor to begin conduction and said fourth transistor to become non-conductive, means operative in response to lowering of the absolute value of current being discharged from said condenser to below a predetermined value for causing said third transistor to become non-conductive, said fourth transistor to begin conduction, and for causing an electrical impulse to be delivered to said stroboscopic device to fire said device and thereby cause light to pass through said slot in said opaque disc and to impinge upon said translucent sight glass.

6. A time delay divider system for deriving a signal which follows by a known time interval an instant in time which bears a predetermined relationship to the time of the occurrence of first and second events including: energy storage means, means responsive to said first event for charging with energy said storage means to a predetermined maximum value, a first storage discharge means for discharging said storage means at a first predetermined rate, a second storage discharge means for discharging said storage means at a second predetermined rate, means effective to initiate operation of said first storage discharge means operative in response to the occurrence of said first event, means effective to initiate operation of said second storage discharge means operative in response to the occurrence of said second event, signalling means, and means for activating said signalling means responsive to the falling below a predetermined energy level by said energy storage means whereby a delayed signal is derived which follows a known time interval an instant in time which bears a predetermined time dividing relationship to the occurrence of said first and second signals is derived from said signaling means.

7. The combination as specified in claim 6 wherein said first storage discharge means is related to said second storage discharge means in such a manner that said first rate of discharge is substantially one-half of the second rate of discharge whereby said predetermined time dividing relationship is such as to divide the time between the occurrence of said first and second events into substantially equal time periods.

8. A radio direction finder comprising: a rotatable directional receiving antenna having a response pattern with at least one null-signal receiving point indicating a minimum response to radio signals from a transmitting source as the antenna is rotated on an axis approximately perpendicular to the line of direction of said transmitting source, said null-signal receiving point occurring when said antenna is in a position bearing a predetermined rotational position relationship with said source of radio signals; means for coupling signals induced in said antenna to a receiver including a detector; a null-detecting means coupled to said receiver detector to provide a null signal the amplitude of which is dependent upon the position of said antenna relative to said source of radio signals and which varies from a given level to a null level when said antenna is rotated to a null-signal receiving position and returns from said null level to said given level when said antenna is rotated away from said null-signal receiving position; a voltage level sensitive means responsive to said null detecting means for producing a distinct electrical signal while said null signal from said null detecting means exceeds a predetermined level variation; and means responsive to said electrical signal for manifesting that the level variation of said null-indicating signal exceeds said predetermined level variation.

9. A radio direction finder as described in claim 8 wherein said voltage level sensitive means includes: a first and second transistor each having an emitter, collector and base electrode; a common impedance means coupling the emitter electrode of each transistor to a source of reference potential; a separate impedance means coupling the collector of each to a source of potential; impedance means coupling the collector electrode of said first transistor to the base electrode of said second transistor, whereby said second transistor is rendered conductive while said first transistor is held non-conductive and non-conductive while said first transistor is held conductive; and means for coupling the base electrode of said first transistor to said null detector and for biasing said first transistor to be non-conductive while said null signal does not exceed said predetermined level variation and conductive while said null signal exceeds said predetermined level variation whereby a null signal condition is manifested while said first transistor is conductive in order that said null-signal receiving position may be determined by dividing the time said null signal condition is manifested as said antenna is being rotated at a substantially constant angular velocity.

10. A radio direction finder as described in claim 9 further including a means for dividing the time said first transistor is conductive and provide a manifestation of that divided time whereby said null-signal receiving position of said antenna may be determined.

References Cited in the file of this patent
UNITED STATES PATENTS

| | | |
|---|---|---|
| 1,965,837 | Herdeg | July 10, 1934 |
| 2,130,913 | Tolson | Sept. 20, 1938 |
| 2,226,860 | Greig | Dec. 31, 1940 |
| 2,232,096 | Dane | Feb. 18, 1941 |
| 2,870,442 | Polydoroff | Jan. 20, 1959 |